United States Patent
Powell et al.

(10) Patent No.: US 10,704,805 B2
(45) Date of Patent: Jul. 7, 2020

(54) HVAC SYSTEMS AND METHODS WITH IMPROVED HEATING ELEMENT CONTROL

(71) Applicant: Lennox Industries Inc., Richardson, TX (US)

(72) Inventors: Joe Powell, Garland, TX (US); Lee Nelson, Portland, OR (US); Hermon Alan Boyd, Red Oak, TX (US)

(73) Assignee: Lennox Industries Inc., Richardson, TX (US)

( * ) Notice: Subject to any disclaimer, the term of this patent is extended or adjusted under 35 U.S.C. 154(b) by 1613 days.

(21) Appl. No.: 14/453,565

(22) Filed: Aug. 6, 2014

(65) Prior Publication Data

US 2016/0040907 A1    Feb. 11, 2016

(51) Int. Cl.
| | |
|---|---|
| F24H 9/20 | (2006.01) |
| F24D 19/10 | (2006.01) |
| G05D 23/19 | (2006.01) |
| F24H 3/04 | (2006.01) |
| G05B 5/01 | (2006.01) |
| F24D 13/02 | (2006.01) |
| F24H 3/00 | (2006.01) |
| F24D 5/04 | (2006.01) |

(52) U.S. Cl.
CPC ....... F24H 9/2071 (2013.01); F24D 19/1096 (2013.01); F24H 3/0411 (2013.01); G05D 23/1904 (2013.01); F24D 5/04 (2013.01); F24D 13/02 (2013.01); F24H 3/002 (2013.01); G05B 5/01 (2013.01)

(58) Field of Classification Search
CPC .................................. F24H 9/00; F24H 3/00
USPC ......................................................... 454/256
See application file for complete search history.

(56) References Cited

U.S. PATENT DOCUMENTS

| | | | | |
|---|---|---|---|---|
| 2,490,095 | A * | 12/1949 | Rosche | F23N 5/082 431/25 |
| 2,835,321 | A * | 5/1958 | De Lancey | F23N 5/04 361/163 |
| 2,854,533 | A * | 9/1958 | De Lancey | F23N 5/22 200/286 |
| 2,955,245 | A * | 10/1960 | Payne | H02J 7/047 219/209 |
| 3,116,398 | A * | 12/1963 | Welch | G05D 23/1913 219/398 |
| 3,255,804 | A * | 6/1966 | Lang | F23D 11/345 239/102.2 |
| 3,269,450 | A * | 8/1966 | Licata | F23N 1/027 431/31 |

(Continued)

*Primary Examiner* — Steven B McAllister
*Assistant Examiner* — Daniel E. Namay
(74) *Attorney, Agent, or Firm* — Hubbard Johnston, PLLC

(57) ABSTRACT

Systems, tools, and methods are presented that enable a circuit to introduce a random time delay before actuating a relay to start or stop a supply of electrical power to a heating element of a heating, ventilating, and air conditioning (HVAC) system. In one instance, the circuit includes a time-delay switch electrically connected to the relay. The time-delay switch has a random time delay before entering a closed state or open state. The relay is operable to start and stop a supply of electrical power to the heating element in response to the switch entering, respectively, the closed state and the open state. Other systems, tools and methods are presented.

7 Claims, 6 Drawing Sheets

(56) References Cited

U.S. PATENT DOCUMENTS

| | | | | |
|---|---|---|---|---|
| 3,335,382 A | * | 8/1967 | Forbes | F23N 5/143 |
| | | | | 338/22 R |
| 3,341,689 A | * | 9/1967 | Reichenbach | F24H 3/0417 |
| | | | | 126/110 R |
| 3,401,880 A | * | 9/1968 | Verden | G05D 23/1931 |
| | | | | 219/505 |
| 3,421,054 A | * | 1/1969 | Herrmann | H01S 1/00 |
| | | | | 338/22 SD |
| 4,906,177 A | * | 3/1990 | Newberry | F23N 5/203 |
| | | | | 431/46 |

* cited by examiner

HVAC SYSTEMS AND METHODS WITH IMPROVED HEATING ELEMENT CONTROL

TECHNICAL FIELD

The present disclosure relates generally to heating, ventilating, and air conditioning (HVAC) systems, and more particularly, to power control circuits that regulate a supply of electrical power to heating elements.

BACKGROUND

Heating, ventilating, and air conditioning (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating, cooling, or dehumidifying the air).

The heating aspect of an HVAC system may utilize an electric furnace that includes heating elements. The electric furnace typically incorporates one or more relays to control a supply of electrical power to the heating elements.

BRIEF DESCRIPTION OF THE DRAWINGS

Illustrative embodiments of the present disclosure are described in detail below with reference to the attached drawing figures, which are incorporated by reference herein.

Figure 1:
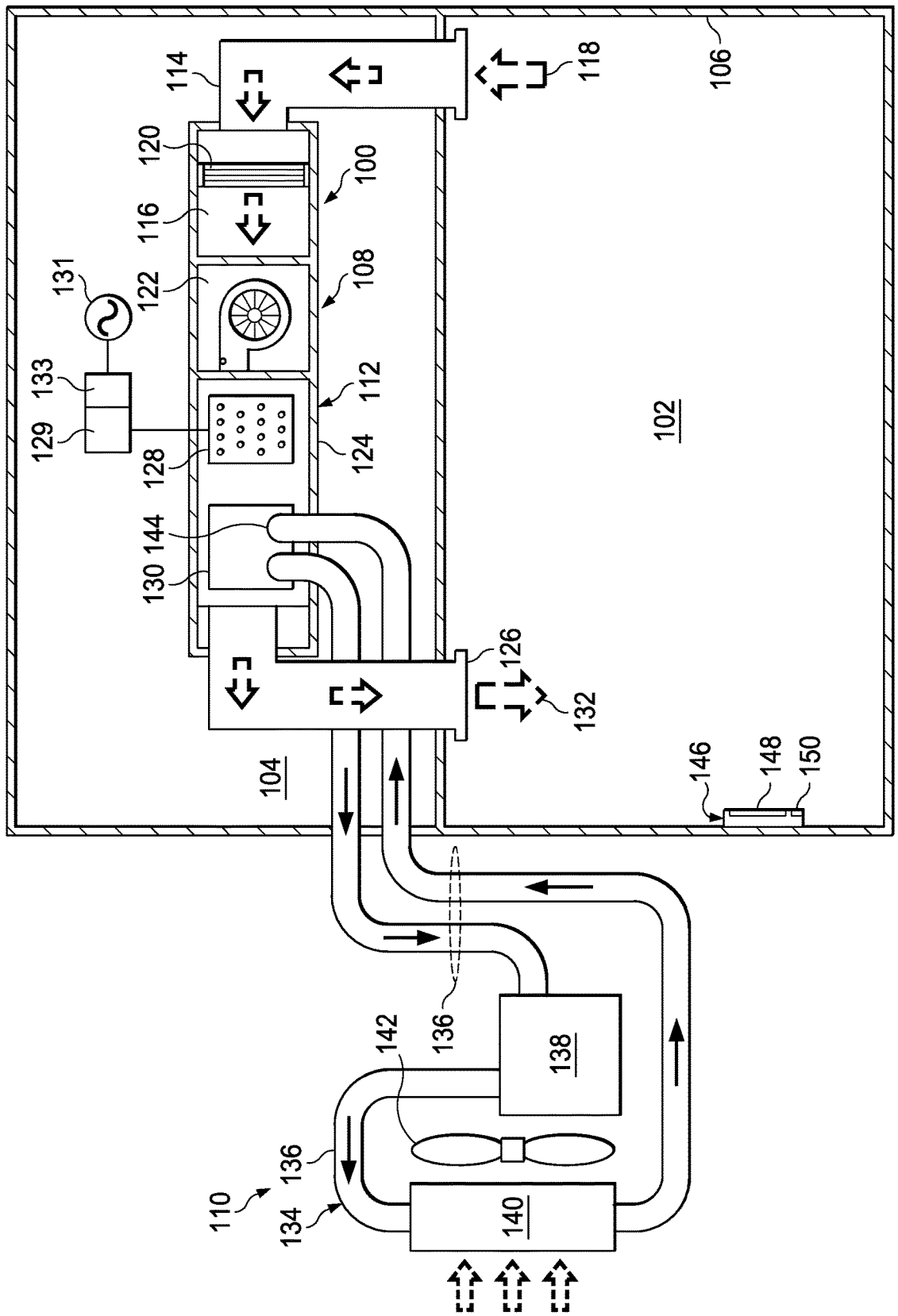
FIG. 1 is a schematic diagram of an HVAC system having an electric furnace, according to an illustrative embodiment.

The figures described above are only exemplary and their illustration is not intended to assert or imply any limitation with regard to the environment, architecture, design, configuration, method, or process in which different embodiments may be implemented.

DETAILED DESCRIPTION

HVAC systems that incorporate an electric furnace commonly utilize a relay to control a supply of electrical power to a heating element within the furnace. The relay is typically triggered by a thermostat to actuate between an open position and a closed position. In the open position, the relay prevents current from flowing through the heating element. In the closed position, however, the relay allows current to flow through the heating element. Current flowing through the heating element enables the electric furnace to generate heat. Relays, however, are susceptible to contact erosion, which causes premature failure. Mitigating contact erosion in relays is desirable to increase a reliability of the electric furnace.

HVAC systems may provide power to the electrical furnace using one or more sources of alternating current. Such sources produce current whose magnitude is defined by a periodic waveform, often a sinusoid. Positive magnitudes correspond to a forward flowing current, and negative magnitudes, to a reverse flowing current. Premature failure of the relay, however, may occur if the thermostat consistently triggers the relay to actuate at a same point of the periodic waveform.

For example, when the relay actuates from the closed position to the open position, two contacts of the relay separate to produce a gap. During separation, an arc of current jumps the gap in a direction that corresponds to a magnitude of the periodic waveform (i.e., the forward flowing current or the reverse flowing current). The arc concomitantly transfers material from a source contact to a target contact. If the relay is triggered to only actuate at the same point of the periodic waveform, the direction of the arc is one-way and the source and target contacts always remain the same. One contact of the relay therefore grows at the expense of the other, which eventually erodes away, leading to failure.

Premature failure of the relay may be mitigated if actuation of the relay occurs randomly, or at least at varied points, over the periodic waveform. Under random actuation, the magnitude of the periodic waveform distributes evenly between the forward and reverse flowing currents; the direction of the arc is two-way. Thus, the two contacts of the relay share roles equally as source and target contacts and a net transfer of material is zero over many actuations.

The embodiments described herein relate to systems, tools, and methods for controlling a heating element in an HVAC system. More specifically, systems, tools, and methods are presented that enable a circuit to introduce a random time delay before actuating a relay to start or stop a supply of electrical power to the heating element. In one embodiment, the circuit includes a time-delay switch electrically connected to the relay. The time-delay switch has a random time delay before entering a closed state or open state. The relay is operable to start and stop the supply of electrical power to the heating element in response to the switch entering, respectively, the closed state and the open state. Other systems, tools and methods are presented.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In the drawings and description that follow, like parts are typically marked throughout the specification and drawings with the same reference numerals or coordinated numerals. The drawing figures are not necessarily to scale. Certain features of the illustrative embodiments may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The various characteristics mentioned above, as well as other features and characteristics described in more detail below, will be readily apparent to those skilled in the art with the aid of this disclosure upon reading the following detailed description of the embodiments, and by referring to the accompanying drawings. Other means may be used as well.

Referring now to the drawings and primarily to FIG. 1, a heating, ventilating, and air conditioning (HVAC) system 100 is presented. The HVAC system 100 is for providing conditioned air to a first closed space 102, such as the interior of a building. At least a portion of the HVAC system 100 is disposed within a second closed space 104, or equipment space. The spaces may be defined by a plurality of walls 106. In this embodiment, a portion 108 of the system 100 is located within the building, i.e., within the second closed space 104, and a portion 110 outside the building.

The HVAC system 100 includes an HVAC unit 112 that is disposed within the second closed space 104, or equipment space. In other embodiments, the HVAC unit 112 is substantially located on a roof top or other location. The HVAC unit 112 includes a return air duct 114 that receives air 118 from the first closed space 102. The return air duct 114 may include or be coupled to a transition duct 116 that may include one or more filters 120. A blower 122 pulls the return air into the return air duct 114. The blower 122 is fluidly coupled to the return air duct 114. The blower 122 moves air into a conditioning compartment 124.

The conditioning compartment 124 is fluidly coupled to the blower 122 for receiving air therefrom to be treated. The conditioning compartment 124 is formed with a plurality of compartment walls and may include a portion of a delivery duct 126 in some embodiments. A heating unit 128 is fluidly coupled to the conditioning compartment 124 for selectively heating air therein. The heating unit 128 includes a heating element electrically connected to a relay 129, and the relay 129 to an alternating current source 131. A time-delay switch 133 is electrically connected to the relay 129 and is configured to enter a closed state or an open state after a random time delay. As used herein, random is used in a broad sense and may include nearly or substantially random time delays. The relay 129 is operable to start and stop a supply of electrical power 131 to the heating element in response to the time-delay switch 133 entering, respectively, the closed state and the open state. A cooling unit 130 is also fluidly coupled to the conditioning compartment 124 for selectively cooling air therein. The cooling unit 130 includes a refrigerant, or working fluid. In certain embodiments, the cooling unit 130 may be an evaporator coil or device for receiving heat from the air flowing over the cooling unit. The cooling unit 130 includes at least one heat exchange surface. It will be appreciated that the order of the heating unit 128 and cooling unit 130 may be varied.

The cooling unit 130 is associated with a cooling subsystem 134. The cooling subsystem 134 is any system that is operational to develop a chilled working fluid for receiving heat within the cooling unit 130. The cooling subsystem 134 typically includes a closed-conduit pathway 136, or circuit. The refrigerant is disposed within the closed conduit pathway 136. The cooling subsystem 134 also includes a compressor 138 fluidly coupled to the closed-conduit pathway 136 for compressing the refrigerant therein. A condenser 140 is fluidly coupled to the closed-conduit pathway 136 downstream of the compressor 138 for cooling the refrigerant. The condenser 140 may include one or more fans 142. An expansion device 144 is coupled to the closed-conduit pathway 136 downstream of the condenser 140 for decreasing a pressure of the refrigerant at the cooling unit 130. The cooling unit 130 includes a heat-exchange surface (not explicitly shown) and is fluidly coupled to the closed-conduit pathway 136 for receiving the refrigerant.

Whether heated by the heating unit 128 or cooled by the cooling unit 130, the conditioning compartment 124 produces a treated air 132 that is delivered into the first closed space 102 by the delivery duct 126. The delivery duct 126 is fluidly coupled to the conditioning compartment 124 for discharging the treated air 132 from the conditioning compartment 124 into the first closed space 102.

A control unit 146 may be disposed within the first closed space 102 and optionally include an input device and a display, such as a touch-screen display 148 and a speaker 150 for audible alerts or instructions. The control unit 146 is communicatively coupled (i.e., in communication through wires, wireless, or other means) with the blower 122, the heating unit 128, the cooling unit 130 (or cooling subsystem), or any other suitable devices to be monitored or controlled. The control unit 146 may include a thermostat for providing control signals to the blower 122, heating unit 128, or cooling unit 130 (or cooling subsystem) in response to a measured temperature in the first closed space 102. In some embodiments, the thermostat, if present, is communicatively coupled to the time-delay switch 133 of the heating unit 128. In such embodiments, the thermostat is configured to trigger a state of the time-delay switch 133 in response to a difference between the measured temperature and a reference temperature.

Figure 2A:
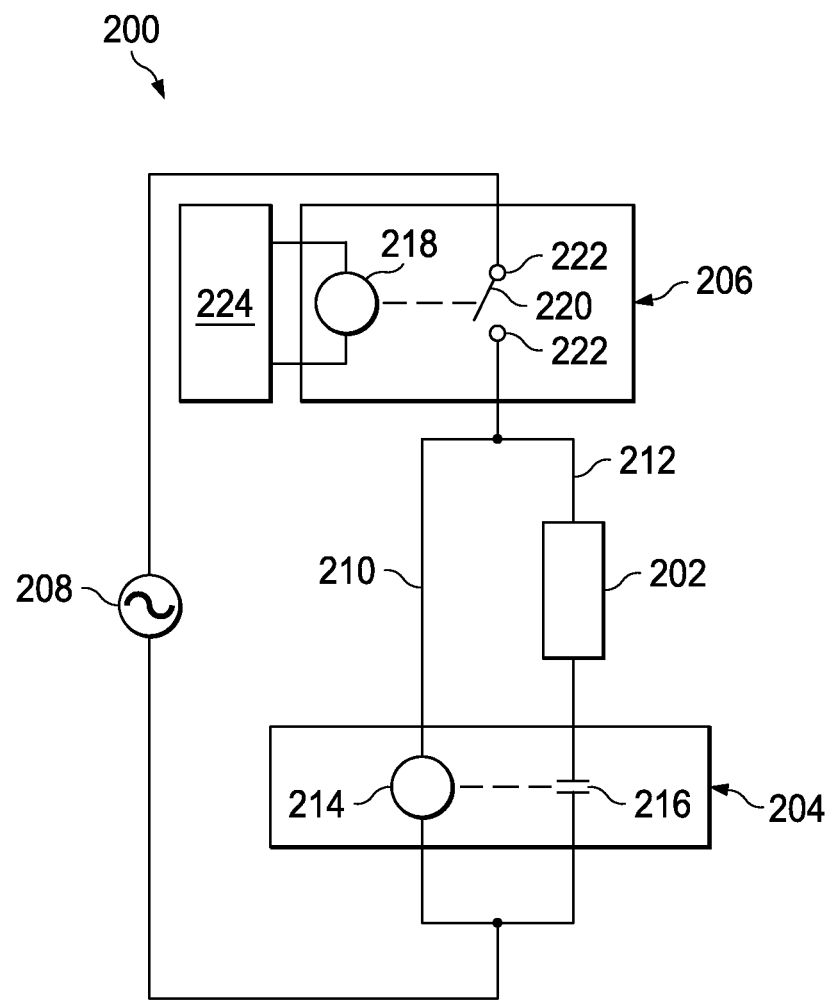
FIG. 2A is an electrical schematic of a circuit for controlling a heating element in an HVAC system, according to an illustrative embodiment.

Now referring primarily to FIG. 2A, an electrical schematic is presented of a circuit 200 for controlling a heating element 202 in an HVAC system, according to an illustrative embodiment. The circuit 200 includes a relay 204 electrically coupled to the heating element 202. In some embodiments, the heating element 202 includes a resistive material that generates heat while conducting an electrical current. The circuit 200 also includes a time-delay switch 206 having a random time delay before entering a closed state or an open state. The time-delay switch 206 is electrically coupled to the relay 204. A source of alternating current 208 is electrically connected to the time-delay switch 206. The relay 204 is configured to start and stop a supply of electrical power to the heating element 202 in response to the time-delay switch 206 entering, respectively, the closed state and the open state.

The circuit 200 includes a first electrical path 210 and a second electrical path 212 coupled in parallel. In such embodiments, the first electrical path 210 includes an actuator 214 of the relay 204 and the second electrical path 212 includes, in series, the heating element 202 and a switchable contact 216 of the relay 204. The switchable contact 216 is operable to switch between a closed position and an open position in response to a force exerted by the actuator 214.

The force is transmitted via a coupling between the actuator 214 and the switchable contact 216. In FIG. 2A, such coupling is indicated by a dashed line. The actuator 214 and the switchable contact 216 may be configured to switch the relay 204 between the open position and the closed position in a millisecond time scale, e.g., 10-40 ms. Other configurations corresponding to other time scales, however, are possible.

When actuated into the closed position, the switchable contact 216 establishes electrical continuity along the second electrical path 212, allowing the relay 204 to start the supply of electrical power to the heating element 202. When actuated into the open position, however, the switchable contact 216 breaks this electrical continuity. The relay 204 is therefore able to stop the supply of electrical power to the heating element 202. In some embodiments, the second electrical path 212 is configured such that the heating element 202 is positioned on a path of electrical continuity between the time-delay switch 206 and the switchable contact 216 of the relay. In other embodiments, the time-delay switch 206 is electrically coupled in series with a parallel configuration of the first electrical path 210 and the second electrical path 212, as shown in FIG. 2A.

In certain embodiments, the actuator 214 may be an electromagnetic coil, and the switchable contact 216, an armature magnetically coupled to the electromagnetic coil. In such embodiments, the armature may be configured to move relative to a stationary contact in response to magnetic induction produced by the electromagnetic coil. The closed position results when the armature is induced by the electromagnetic coil to move and touch the stationary contact. The open position results when the armature is induced by the electromagnetic coil to separate from the stationary contact, creating an adequate gap. Non-limiting examples of relays 204 utilizing such actuators 214 and switchable contacts 216 include model T92S7A22 from Tyco and model AZ2800-2A from American Zettler.

The time-delay switch 206 may include a transducer 218 coupled to a movable contact 220. In FIG. 2A, such coupling is indicated by a dashed line. The transducer 218 is operable to displace the movable contact 220 to connect or disconnect two fixed contacts 222. If the movable contact 220 connects the two fixed contacts 222, the time-delay switch 206 establishes electrical continuity therethrough and enters the closed state. If the movable contact 220 disconnects the two fixed contacts 222, the time-delay switch 206 breaks electrical continuity and enters the open state. FIG. 2A depicts the movable contact 220 as having one permanent connection, i.e., a pivot connection, with one of the two fixed contacts 222. This depiction, however, is not intended as limiting. Displacement of the movable contact 220 could involve simultaneously connecting or disconnecting the two fixed contacts 222 (i.e., no permanent connection). Other arrangements are possible.

The transducer 218, the movable contact 220, and the two fixed contacts 222 are configured to allow the time-delay switch 206 to enter the closed state and the open state, respectively, after a first random time delay and a second random time delay. A time scale of the first random time delay and the second random time delay may be in seconds, e.g., 1-200 ms, 10-300 ms, 1-200 s, and 10-300 s. However, other time scales may be possible. In some embodiments, the first random time delay and the second random time delay are substantially similar. In other embodiments, the first random time delay occurs within a range of 1-45 s and the second random time delay occurs within a range of 1-110 s. In still other embodiments, a thermostat 224 is electrically coupled to the time-delay switch 206 and configured to trigger the transducer 218 to displace the movable contact 220, i.e., actuate the time-delay switch 206. In such embodiments, the thermostat 224 may trigger the time-delay switch 206 to actuate in response to a difference between a measured temperature and a reference temperature.

In some embodiments, the time-delay switch 206 is a sequencer having a bimetallic actuator. The bimetallic actuator is analogous to the transducer 218 and may be a wire wrapped around a bimetal strip. The wire is operable to generate heat when a low voltage current is passed therethrough. Such heat causes the bimetal strip to bend along a known direction and for a known distance, thereby generating a motive force. Non-limiting examples of sequencers include models 51172-20-24 and 51172-30-16 from Texas Instruments, Inc. and models 145X222, 15S2, and 88W79 from Thermodisc, Inc.

In operation, the circuit 200 controls the heating element 202 of the HVAC system using the time-delay switch 206. When the time-delay switch 206 is in the closed state, the heating element 202 is active and generates heat. Conversely, when the time-delay switch 206 is in the open state, the heating element 202 is dormant and generates no heat. Actuation of the time-delay switch 206 between the closed state and the open state occurs in response to a demand for heat. The thermostat 224, if present, may determine the demand for heat by comparing the difference between the measured temperature and the reference temperature. If the measured temperature is less than the reference temperature, the thermostat 224 triggers the time-delay switch 206 to actuate into the closed state (provided the time-delay switch 206 is not already in the closed state). If the measured temperature is greater than or the same as than the reference temperature, the thermostat 224 triggers the time-delay switch 206 to actuate into the open state (provided the time-delay switch 206 is not already in the open state).

For the time-delay switch 206 to enter the closed state, the transducer 218 displaces the movable contact 220 to connect the two fixed contacts 222. Such connection occurs after the random time delay, which may be the first random time delay. Connection of the two fixed contacts 222 allows the circuit 200 to develop an uninterrupted electrical path that includes the time-delay switch 206, the first electrical path 210, the actuator 214 of the relay 204, and the source of alternating current 208. Alternating current then flows along the uninterrupted electrical path, energizing the relay 204 and inducing the actuator 214 to switch the switchable contact 216 into the closed position. The closed position of the switchable contact 216 establishes electrical continuity in the second electrical path 212, allowing alternating current to also flow through the heating element 202. The heating element 202 therefore becomes active and generates heat.

For the time-delay switch 206 to enter the open state, the transducer 218 displaces the movable contact 220 to disconnect the two fixed contacts 222. This disconnection occurs after the random time delay, which may be the second random time delay. Electrical continuity is no longer present through the time-delay switch 206, which also eliminates electrical continuity through the circuit 200. Alternating current ceases to flow in the second electrical path 212, causing the heating element to stop generating heat and become dormant. Alternating current also ceases to flow in the first electrical path 210, causing the relay 204 to de-energize and inducing the actuator 214 to switch the switchable contact 216 into the open position.

It will be appreciated that the circuit 200 incorporates the relay 204 in a position subservient to the time-delay switch 206: the relay 204 switches to the closed or open position in response to the time-delay switch 206 entering, respectively, the closed state or the open state. This subservient position enables the time-delay switch 206 to impose the random time delay onto actuation of the relay 204. The rely 204 is therefore actuated randomly over a periodic waveform of the alternating current, which is typically a sinusoid. As a result, contact erosion of the switchable contact 216 is mitigated, reducing a risk of premature failure for the relay 204.

Figure 2B:
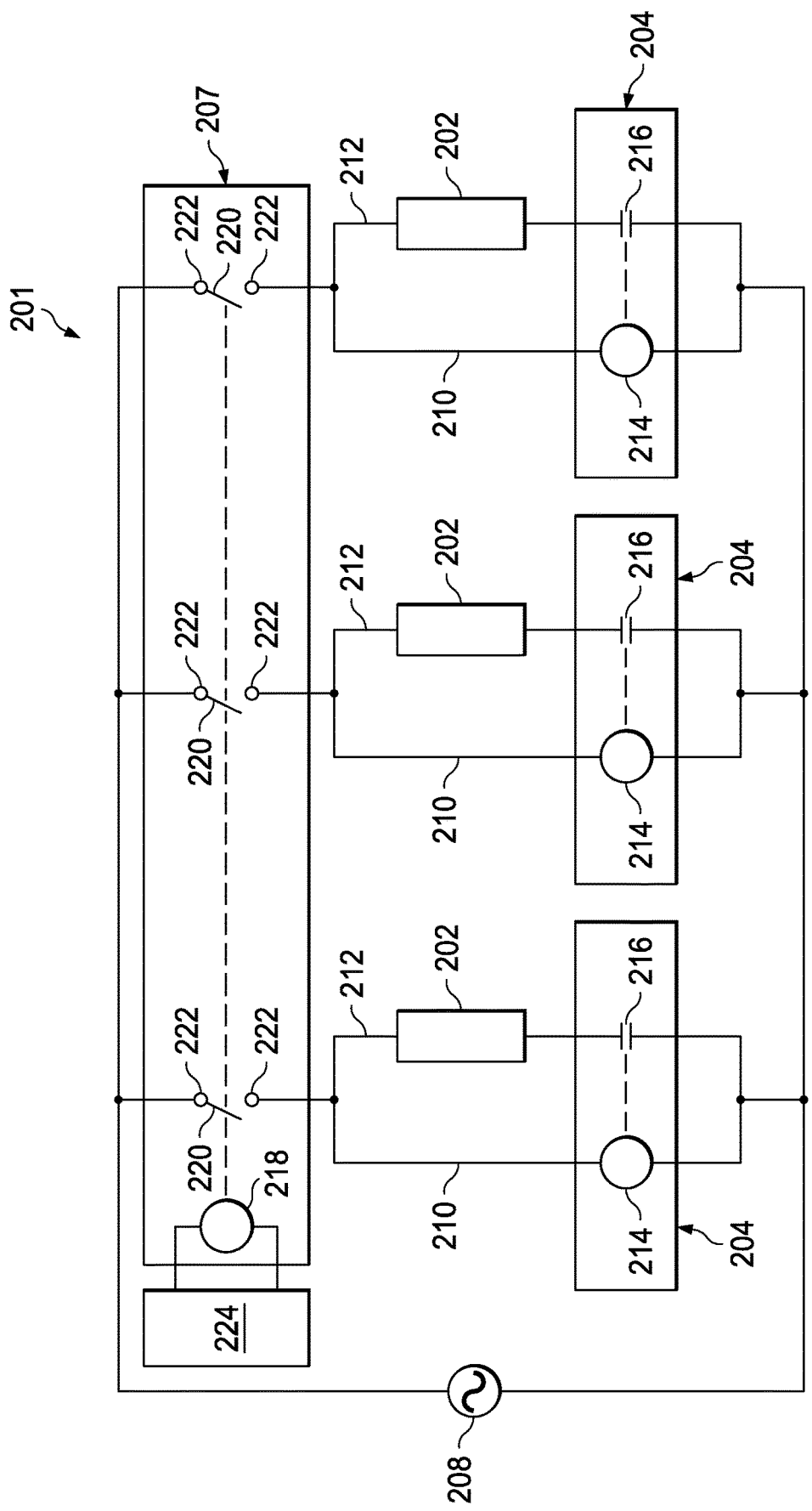
FIG. 2B is an electrical schematic of a circuit for controlling a plurality of heating elements in an HVAC system, according to an illustrative embodiment.

The time-delay switch 206 need not be limited to a single combination of the relay 204 and the heating element 202, as illustrated in FIG. 2A. In FIG. 2B, an electrical schematic is presented of a circuit 201 for controlling a plurality of heating elements 202 in an HVAC system, according to an illustrative embodiment. The circuit 201 of FIG. 2B includes a time-delay switch 207 having a plurality of movable contacts 220, each of which, is electrically connected to a relay 204 and a heating element 202. FIG. 2B depicts the plurality of movable contacts 220 as being three pairs of movable contacts 220. However, this depiction is for illustrative purposes only. Other numbers and configurations of movable contacts 220 are possible. In operation, a transducer 218 displaces the plurality of movable contacts 220, as a group, to connect or disconnect two fixed contacts 222 associated with each movable contact 220. This displacement establishes or breaks electrical continuity with a source of alternating current 208. The time-delay switch 207 therefore enables the circuit 200 to control the plurality of heating elements 202 in a manner similar to that described in relation to FIG. 2A.

In some embodiments, the time-delay switch 207 is a sequencer having a bimetallic actuator and a plurality of movable contacts 220. In such embodiments, the bimetallic actuator is analogous to the transducer 218. The sequencer may be configured such that the bimetallic actuator displaces the plurality of movable contacts 220 to simultaneously connect or disconnect all associated pairs of fixed contacts 222. In further embodiments, the sequencer is configured such that the bimetallic actuator displaces the plurality of movable contacts 220 to connect or disconnect the associated pairs of fixed contacts 222 in a predetermined sequence.

Figure 2C:
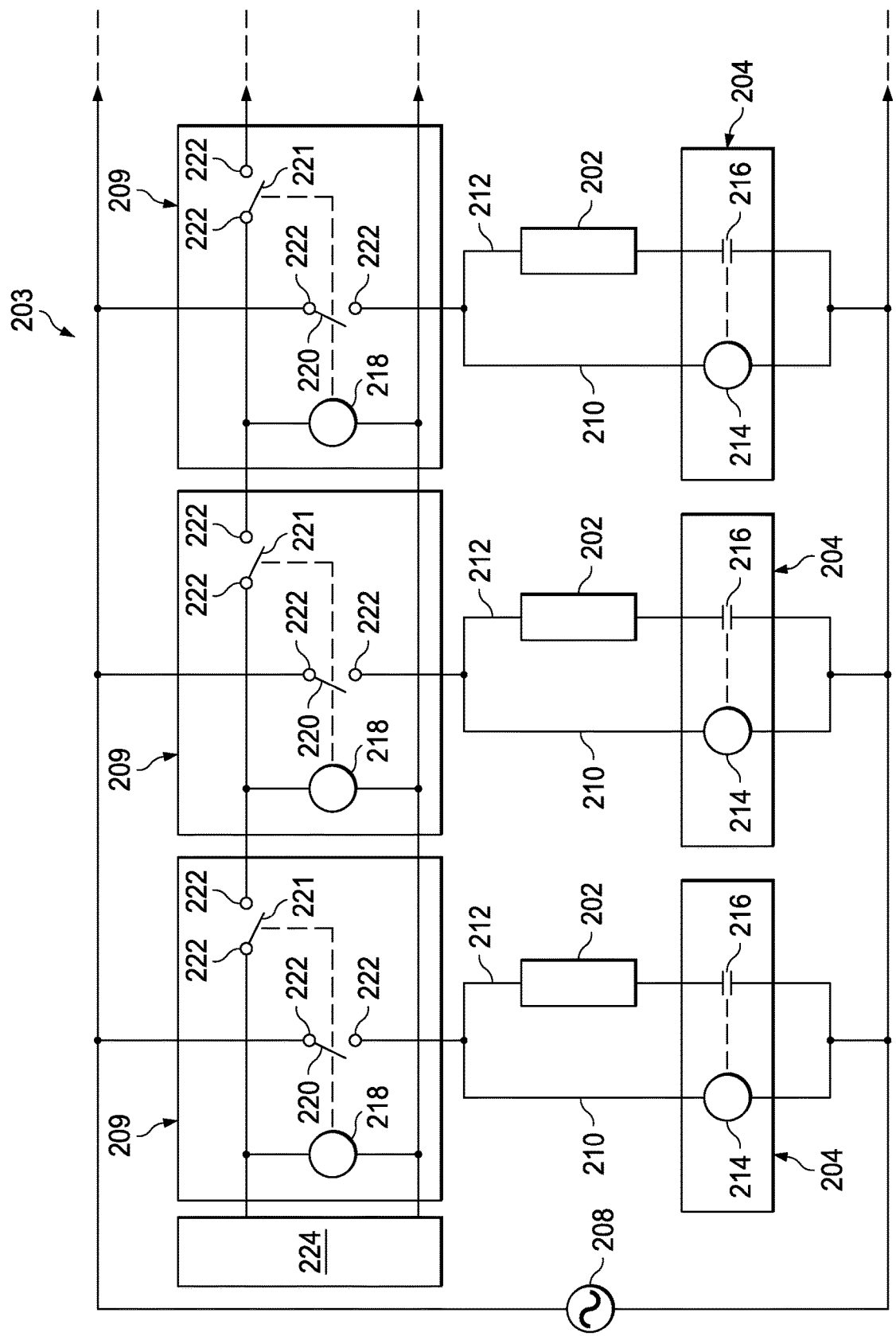
FIG. 2C is an electrical schematic of a circuit for controlling a plurality of heating elements in an HVAC system and having a plurality of time-delay switches electrically connected in series, according to an illustrative embodiment.

It will be appreciated that time-delay switches 207 having a plurality of movable contacts 220 need not be limited to electrical connections with the relay 204 and the heating element 202. Electrical connections with other components are possible. For example, and without limitation, such electrical connections may include those between time-delay switches 207. In FIG. 2C, an electrical schematic is presented of a circuit 203 for controlling a plurality of heating elements 202 in an HVAC system and having a plurality of time-delay switches 209 electrically connected in series, according to an illustrative embodiment. Dots are used at circuit junctions to indicate an electrical connection between multiple electrical pathways. In contrast, circuit junctions having independent pathways lack such dots (i.e., no electrical connection therebetween).

Each time-delay switch 209 of the circuit 203 includes a pair of movable contacts 220, 221. One movable contact 220 is electrically connected to a relay 204 and a heating element 202. The other movable contact 221 is electrically connected to a time-delay switch 209. Each time-delay switch 209 of the circuit 203 also includes a transducer 218 coupled to the pair of movable contacts 220, 221. The transducer 218 is operable to simultaneously displace the pair of movable contacts 220, 221. Such displacement connects or disconnects, after a random time delay, two fixed contacts 222 associated with each movable contact 220, 221. If all fixed contacts 222 become connected, the time-delay switch 209 enters a closed state. If all fixed contacts 222 become disconnected, the time-delay switch 209 enters an open state.

The plurality of time-delay switches 209 forms a series arrangement, which typically starts with an electrical connection to a thermostat 224. The series arrangement may contain any number of time-delay switches 209, depending on a number of heating elements 202 required for the HVAC system. For illustrative purposes, FIG. 2C has been depicted with three time-delay switches 209. However, this depiction is not intended as limiting. The circuit 203 may include two or more time-delay switches 209 and their associated relays 204 and heating elements 202. Dashes adjacent arrowed circuit terminations in FIG. 2C indicate an option to include greater numbers of time-delay switches 209, relays 204, and heating elements 202.

Because of the series arrangement, the movable contacts 221 control a flow of electrical power between adjacent time-delay switches 209. Each movable contact 221 is operable to establish and break electrical continuity between transducers 218 of the time-delay switches 209. Thus, the movable contact 221 of one time-delay switch 209 is capable of triggering the transducer 218 of an adjacent time-delay switch 209 to actuate. In operation, the thermostat 224 initiates a cascade process by triggering the transducer 218 of the closest electrically-connected time-delay switch 209 to actuate. The time-delay switches 209 then progressively actuate down the series arrangement until all exhibit a similar state (i.e., all closed or all open). As the state for each time-delay switch 209 changes, the corresponding heating element 202 becomes either active (i.e., the closed state) or dormant (i.e., the open state). It will be appreciated that, due to the random time delay associated with each time-delay switch 209, the corresponding heating element 202 will be equivalently delayed before becoming active or dormant.

Figure 3:
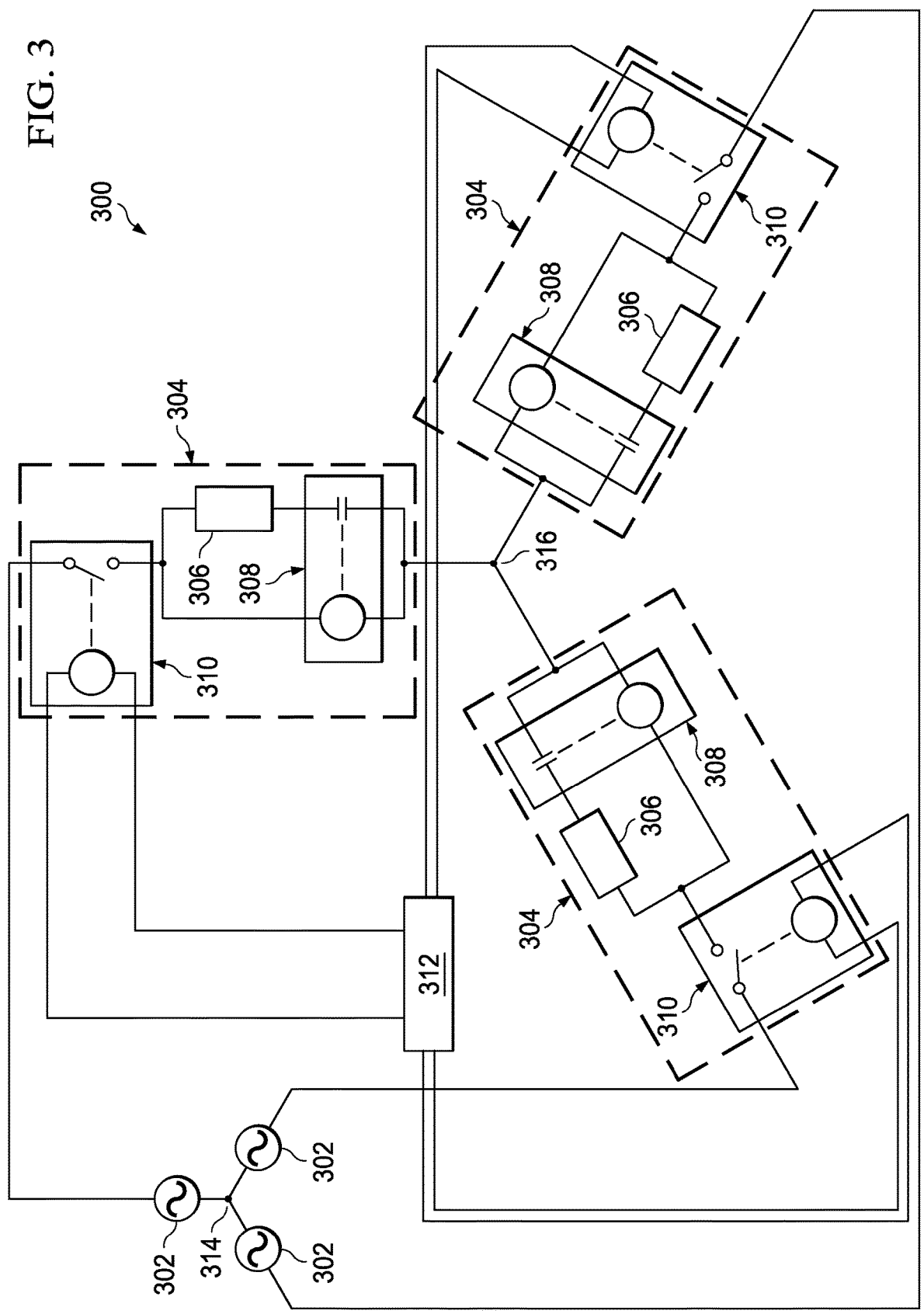
FIG. 3 is an electrical schematic of a portion of an HVAC system having at least one source of alternating current and a corresponding circuit for controlling a heating element.

Now referring primarily to FIG. 3, an electrical schematic is presented of a portion of an HVAC system 300 having at least one source of alternating current 302 and a circuit 304 corresponding to the at least one source of alternating current 302. The at least one source of alternating current 302 may have a frequency between 40-70 Hz. In some embodiments, the at least one source of alternating current 302 has a root mean square voltage between 100-250 V. In some embodiments, the root mean square voltage is between 450-590 V. In other embodiments, the at least one source of alternating current 302 includes three sources of alternating current 302. In further embodiments, the three sources of alternating current 302 may have a phase separation of substantially one-third of a cycle.

The circuit 304 is electrically-coupled to the at least one source of alternating current 302, and in some embodiments, the circuit 304 is electrically coupled to a single source of alternating current 302 as shown in FIG. 3. The circuit 302 includes a heating element 306 electrically connected to a relay 308. In some embodiments, the heating element 306 includes a resistive material that generates heat while conducting an electrical current. The circuit 302 also includes a time-delay switch 310 having a random time delay before entering a closed state or an open state. The time-delay switch 310 is electrically coupled to the relay 308, and in some embodiments, is a sequencer having a bimetallic contact. The relay 308 is configured to start and stop a supply of electrical power to the heating element 306 in response to the time-delay switch 310 entering, respectively, the closed state and the open state.

The portion of an HVAC system 300 includes a thermostat 312 that is electrically coupled to the time-delay switch 310 of each circuit 304. The thermostat 312 is configured to trigger a state of the time-delay switch 310 in response to a difference between a measured temperature and a reference temperature. If the measured temperature is less than the reference temperature, the thermostat 312 triggers the time-delay switch 310 to actuate into the closed state (provided the time-delay switch 310 is not already in the closed state). If the measured temperature is greater than or the same as than the reference temperature, the thermostat 312 triggers the time-delay switch 310 to actuate into the open state (provided the time-delay switch 310 is not already in the open state).

In FIG. 3, the portion of an HVAC system 300 is depicted as having three electrical paths, each electrical path including a single source of alternating current 302 and a single circuit 304. The three electrical paths connect in parallel and terminate in a wye configuration at a first node 314 and a second node 316. Such connection may represent a three-phase power distribution. However, the depiction of FIG. 3 is not intended as limiting. Each circuit 304 of the HVAC system 300 need not correspond to a single source of alternating current 302 and electrical connections therebetween may produce different numbers and configurations of electrical paths. Furthermore, while each circuit 304 of FIG. 3 is depicted similarly to the circuit 200 of FIG. 2A, such depiction is for illustrative purposes only. Each circuit 304 of FIG. 3, for example, could be configured similarly to the circuit 201 of FIG. 2B. Other configurations of the circuit 304 are possible, along with combinations of such configurations.

In operation, the at least one source of alternating current 302 provides electrical power to the corresponding circuit 304. In the illustrative embodiment shown by FIG. 3, the circuit 304 operates analogously to the circuit 200 described in relation to FIG. 2A. However, in FIG. 3, the first node 314 and the second node 316 serve as sources or sinks for each electrical path, depending on a direction of current flow along such path. If the three sources of alternating current 302 are separated in phase by one-third of a cycle, i.e., 120°, the first node 314 and the second node 316 continuously experience a net current sum of zero.

According to an illustrative embodiment, a method for controlling a heating element in an HVAC system when the heating element utilizes an alternating current includes the step of actuating a time-delay switch into a closed state after a first random time delay, thereby energizing a relay. The method also includes the step of actuating a time-delay switch into an open state after a second random time delay, thereby de-energizing a relay. The relay, when energized, is operable to start a supply of electrical power to the heating element, and when de-energized, is operable to stop the supply of electrical power to the heating element. In some embodiments, the alternating current has a frequency between 40-70 Hz.

Figure 4:
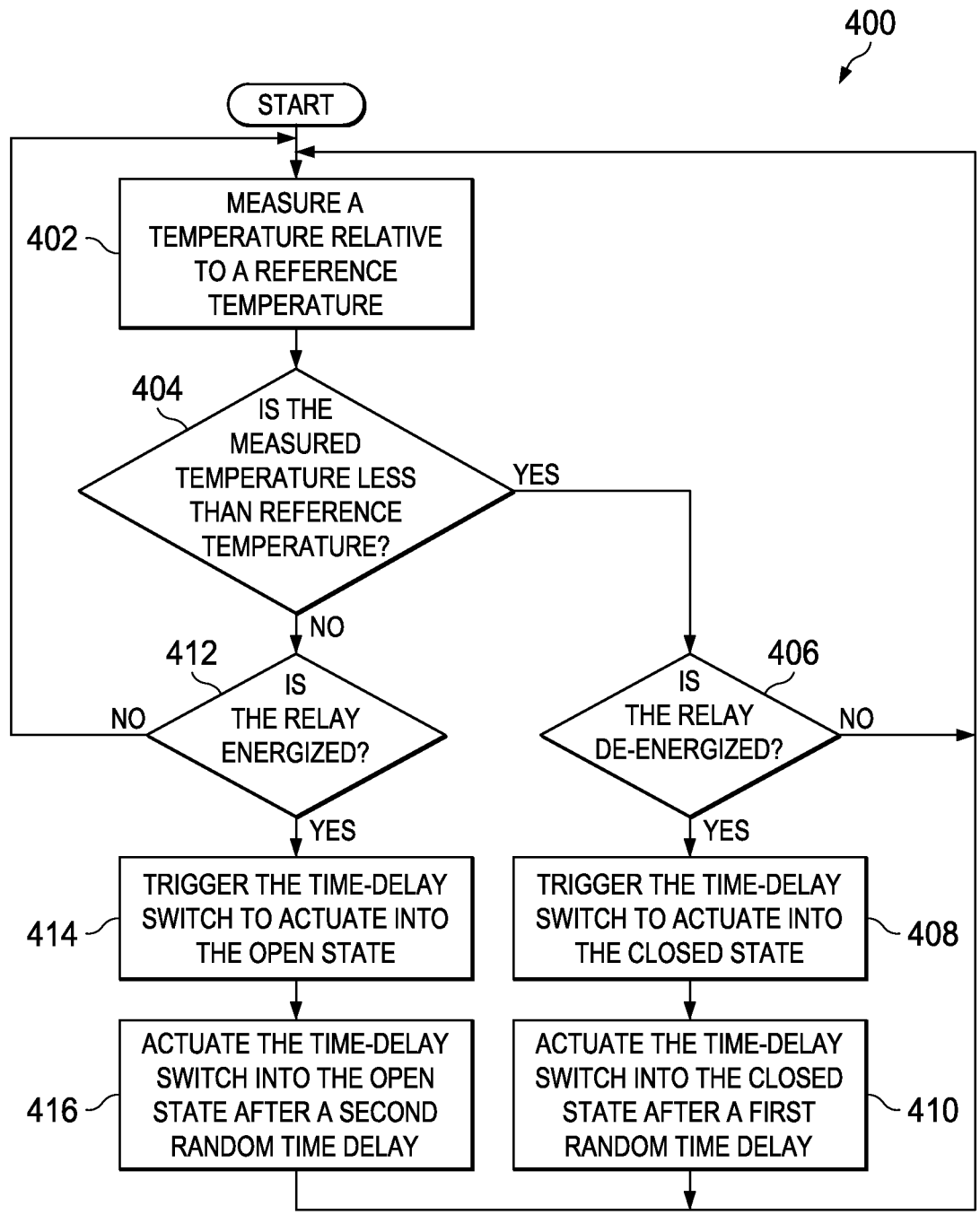
FIG. 4 is an illustrative flow chart of a method for controlling a heating element in an HVAC by triggering a time-delay switch.

Now referring primarily to FIG. 4, a flow chart is presented of an illustrative method 400 for controlling a heating element in an HVAC by triggering a time-delay switch. The heating element utilizes an alternating current, and typically, includes a resistive material that generates heat while conducting an electric current. The method 400 includes the step 402 of measuring a temperature in a space to be conditioned and relative to a reference temperature. The step 402 of measuring the temperature may include a decision, represented by interrogatory 404, of determining if the measured temperature is less than the reference temperature.

If the measured temperature is less than the reference temperature, the method 400 proceeds from interrogatory 404 to a decision to determine if a relay is de-energized, represented by interrogatory 406. If the relay is de-energized, the method 400 proceeds to the step 408 of triggering the time-delay switch to actuate into a closed state. The method 400 then continues with the step 410 of actuating the time-delay switch into the closed state after a first random time delay, thereby energizing the relay. The energized relay is operable to start a supply of electrical power to the heating element. If the relay is not de-energized, the method 400 returns to the step 402 of measuring the temperature relative to the reference temperature.

If the measured temperature is not less than the reference temperature, i.e., is greater than or equal to the reference temperature, the method 400 proceeds from interrogatory 404 to a decision to determine if the relay is energized, represented by interrogatory 412. If the relay is energized, the method 400 proceeds to the step 414 of triggering the time-delay switch to actuate into an open state. The method 400 then continues with the step 416 of actuating the time-delay switch into the open state after a second random time delay, thereby de-energizing the relay. The de-energized relay is operable to stop the supply of electrical power to the heating element. If the relay is not energized, the method 400 returns to the step 402 of measuring the temperature relative to the reference temperature.

In some embodiments, the alternating current has a frequency between 40-70 Hz. In some embodiments, a thermostat is used for the step 402 of measuring the temperature, the step 408 of triggering the time-delay switch to actuate into the closed state, and the step 414 of triggering the time-delay switch to actuate into the open state. In some embodiments, the time delay switch is a sequencer having a bimetallic actuator.

In addition to the embodiments described above, many examples of specific combinations are within the scope of the disclosure, some of which are detailed below.

Example 1

An HVAC system, the HVAC system comprising:
at least one source of alternating current for providing electrical power;
a circuit corresponding to the at least one source of alternating current and electrically coupled thereto, the circuit comprising:
a plurality of sub-circuits electrically connected in parallel, each sub-circuit comprising:
a heating element,
a relay electrically connected to the heating element,
a time-delay switch electrically connected to the relay and having a random time delay before entering a closed state or an open state, and
wherein the relay is configured to start and stop a supply of electrical power to the heating element in response to the time-delay switch entering, respectively, the closed state and the open state, and
wherein the time-delay switches of the plurality of sub-circuits are electrically connected therebetween to form a series arrangement; and
a thermostat electrically coupled to the time-delay switch of one sub-circuit, the thermostat configured to trigger a state of the time-delay switch in response to a difference between a measured temperature and a reference temperature.

Example 2

The HVAC system of example 1, wherein the heating element comprises a resistive material that generates heat while conducting an electric current.

Example 3

The HVAC system of example 1, wherein the time-delay switch comprises a sequencer having a bimetallic actuator.

Example 4

The HVAC system of example 1, wherein the at least one source of alternating current has a frequency between 40-70 Hz.

Example 5

The HVAC system of example 1, wherein the at least one source of alternating current has a root mean square voltage between 100-250 V.

Example 6

The HVAC system of example 1, wherein the at least one source of alternating current comprises three sources of alternating current.

Example 7

The HVAC system of example 6, wherein the three sources of alternating current have a phase separation of substantially one-third of a cycle.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

We claim:

1. An HVAC system, the HVAC system comprising:
   at least one source of alternating current for providing electrical power;
   a circuit corresponding to the at least one source of alternating current and electrically coupled thereto, the circuit comprising:
   a heating element,
   a relay electrically connected to the heating element,
   a time-delay switch electrically connected to the relay, the time-delay switch configured to generate a random time delay before entering a closed state or an open state, and
   wherein the relay is configured to start and stop a supply of electrical power to the heating element in response to the time-delay switch entering, respectively, the closed state and the open state;
   a thermostat electrically coupled to the time-delay switch, the thermostat configured to trigger a state of the time-delay switch in response to a difference between a measured temperature and a reference temperature,
   wherein the time-delay switch triggers and de-triggers the relay randomly over a periodic wave form; and
   wherein the time-delay switch is positioned electrically between the thermostat and the relay.

2. The HVAC system of claim 1, wherein the heating element comprises a resistive material that generates heat while conducting an electric current.

3. The HVAC system of claim 1, wherein the time-delay switch comprises a sequencer having a bimetallic actuator.

4. The HVAC system of claim 1, wherein the at least one source of alternating current has a frequency between 40-70 Hz.

5. The HVAC system of claim 1, wherein the at least one source of alternating current has a root mean square voltage between 100-250 V.

6. The HVAC system of claim 1, wherein the at least one source of alternating current comprises three sources of alternating current.

7. The HVAC system of claim 6, wherein the three sources of alternating current have a phase separation of substantially one-third of a cycle.

* * * * *